United States Patent [19]

Hart et al.

[11] Patent Number: 5,730,905

[45] Date of Patent: Mar. 24, 1998

[54] METHOD OF RESOLVING OIL AND WATER EMULSIONS

[75] Inventors: Paul R. Hart; J. Michael Brown, both of The Woodlands, Tex.; Edward J. Connors, Blue Bell, Pa.

[73] Assignee: BetzDearborn Inc., Trevose, Pa.

[21] Appl. No.: 263,302

[22] Filed: Jun. 21, 1994

[51] Int. Cl.$^6$ ............................ B01D 17/04; B01D 17/05
[52] U.S. Cl. ...................... 252/344; 210/708; 252/358
[58] Field of Search ............................ 252/325, 344, 252/358; 210/708

[56] References Cited

U.S. PATENT DOCUMENTS

| | | | |
|---|---|---|---|
| Re. 28,474 | 7/1975 | Anderson et al. | 523/336 |
| Re. 28,576 | 10/1975 | Anderson et al. | 523/336 |
| 3,284,393 | 11/1966 | Vanderhoff | 524/801 |
| 4,343,730 | 8/1982 | Becker et al. | 524/551 |
| 4,348,288 | 9/1982 | Yoshinaga et al. | 210/708 |
| 4,411,814 | 10/1983 | Burkhardt | 252/344 |
| 4,448,708 | 5/1984 | Killat et al. | 252/344 |
| 4,454,047 | 6/1984 | Becker et al. | 252/344 X |
| 4,588,508 | 5/1986 | Allenson et al. | 210/708 |
| 4,686,066 | 8/1987 | Hofinger et al. | 252/344 |
| 4,699,951 | 10/1987 | Allenson et al. | 525/194 |
| 4,741,835 | 5/1988 | Jacques et al. | 210/708 |
| 4,835,234 | 5/1989 | Valint et al. | 526/258 |
| 5,093,006 | 3/1992 | Kalnins | 210/708 X |
| 5,405,554 | 4/1995 | Neff et al. | 252/358 X |

*Primary Examiner*—Richard D. Lovering
*Attorney, Agent, or Firm*—Alexander D. Ricci; Steven D. Boyd

[57] ABSTRACT

Oil-in-water (reverse) and water-in-oil (obverse) emulsions in crude oil production and processing systems are resolved by addition of a treatment solution comprising a copolymer of acryloxyethyltrimethyl ammonium chloride (AETAC) and acrylamide. The mole percent of AETAC is above about 20% and the molecular weight (grams per mole) of the copolymer is above about 2 million. The treatment solution is effective in matrix which include high percentages of oil and at high temperatures.

9 Claims, No Drawings

METHOD OF RESOLVING OIL AND WATER EMULSIONS

FIELD OF THE INVENTION

The present invention relates to a method of resolving or breaking emulsions in crude oil production and processing systems. More particularly, the present invention relates to a method of breaking both reverse (oil-in-water) and obverse (water-in-oil) emulsions through the addition of a copolymer of acryloxyethyltrimethyl-ammonium chloride (AETAC) and acrylamide (AM).

BACKGROUND OF THE INVENTION

In the production, transportation and processing of crude oil, oil-in-water emulsions which must be broken are encountered frequently. Oil-in-water emulsions are also called reverse emulsions and typically must be broken in order to recover the oil therein, to allow reuse of the water, to limit discharge of oil with the water as well as for numerous other reasons.

In oilfield production, additional oil can be recovered from a formation by water flooding. This technique of oil recovery involves the injection of water into the oil producing formation in secondary water floods. In addition, in deposit fields, crude oils form with water present. A large number of methods and effective substances for separating the water from the oil are known in the art. In such separation processes, a separate aqueous phase is formed which, depending on the type of crude oil, may still contain substantial quantities of oil. These have to be removed in a special process by breaking the so-called reverse (oil-in-water) emulsion.

Such so-called reverse emulsions may also arise at the production site where the hydrocarbon, water and solids must be separated prior to transportation of the hydrocarbons to a refinery. Often, the produced fluids are in the form of an oil-in-water emulsion and may be stabilized by the presence of solids. The oil is dehydrated by treating in a free water knockout unit where free water is removed. The so-called obverse (water-in-oil) emulsion then may pass to another unit called a heater treater or coalescer, where a high temperature (12020 –300° C.) matrix comprising mostly oil (51–99%) is treated to remove the water phase by coalescence of small water droplets into progressively larger droplets and eventual gravity separation of the oil and denser water phase. The entering, oil, continuous or obverse, emulsion is resolved to a water content below pipeline or shipping specifications (typically about 3%).

Oil and water emulsions also arise when oil is desalted either at a refinery, production field or platform. Desalting is adapted to remove primarily inorganic salts from the crude prior to refining. The desalting step is provided by adding and mixing with the crude oil at high temperatures (120°–300° F.), a few volume percentages of fresh water to contact brines and salts present in the crude oil, In crude oil desalting, a water-in-oil or obverse emulsion is intentionally formed, with the water admitted being on the order of about 2 to 10 volume percent based upon crude oil. Water is added to the crude and mixed intimately to transfer impurities in the crude to the water phase. Separation of the phases occurs due to coalescence of small water droplets into progressively larger droplets, and eventually gravity separation of the oil and denser water phase occurs.

The resultant effluent brine from a desalter system typically contains dispersed oil and water. This oily effluent can be fed to a hydrocyclone for resolution. However, these water continuous or reverse emulsions are typically too stable to break adequately in a hydrocyclone. The use of chemical additives to destabilize or break reverse emulsions are typically ineffective in hydrocyclones where the high centrifugal forces, high shear forces and short residence times adversely affect operation of the emulsion breakers.

Various additives are known which enhance the breaking of reverse emulsions. For example, U.S. Pat. No. 4,686,066 discloses a method of separation of oil-in-water emulsions by the addition of specific cationic polymers. The specific cationic polymers comprise homo-polymers of diallyldimethylammonium chloride (DADMAC) which contain 5–10% by weight of diallyldimethylammonium chloride monomer.

U.S. Pat. No. 4,411,814 discloses the use of polyamines and/or polyamine salts as demulsifiers that are particularly effective in breaking emulsions formed in surfactant flooding of oil bearing subterranean formations.

SUMMARY OF THE INVENTION

The present inventors have found that a specific cationic copolymer exhibits surprising efficacy in breaking reverse (oil-in-water) and obverse (water-in-oil) emulsions under a wide variety of conditions. The cationic copolymer of the present invention is a copolymer of acryloxyethyltrimethylammonium chloride (AETAC) and acrylamide (AM). The preferred copolymer is a 40 to 80 mole percent AETAC polymerized to a high molecular weight of up to about 20 million in the form of a water-in-oil, or invert, emulsion incorporating appropriate surfactants (i.e., an emulsion polymer) and then inverted and diluted to from about 0.05 to 0.5% actives in water prior to being added to the water phase of the emulsion to be broken.

DESCRIPTION OF THE PREFERRED EMBODIMENT

The method of the present invention provides for the improved separation of water and oil in oil production and processing operations. The method of the present invention comprises treating an oil and water with a copolymer which enhances separation of the oil from the water phase and water from the oil phase. The copolymer treatment of the present invention was found to be effective under a wide variety of conditions. The copolymer of the present invention was found to be effective in oilfield and desalter coalescers, and a refining process hydrocyclone, and an oilfield free water knockout. An oilfield or desalter coalescer typically operates at high temperatures (12020 –300° F.) and is fed a matrix comprising mostly oil (51–98%). A refinery process hydrocyclone or oilfield free water knockout also operates at 12020 –300° F. and is fed a matrix comprising an appreciable fraction (2–50%) of oil.

The copolymer of the present invention may be fed to a coalescer by addition to the free water entrained with the oil continuous emulsion prior to a high shear centrifugal pump, or fed to the water fed to wash salt from the raw crude oil prior to a high shear mix valve. The copolymer of the present invention has also been found to be effective when fed to the hot, oily, water-continuous brine exiting a refinery desalter into a hydrocyclone. Such hydrocyclones produce high centrifugal (500–2000 G's) and shear forces ($10^2$–$10^6$ s$^{-1}$) in relatively short residence times (1–3 second). High molecular weight polymers that tend to work in short residence times tend to degrade at high shear. Low molecular weight surfactants that do not degrade in high shear conditions tend to require long residence times. It was discovered that the high molecular weight copolymer of the present invention was resistant to degradation at high shear and was effective at breaking reverse emulsions in short residence times. In addition, polymers which are effective at ambient, waste water temperatures and in the absence of substantial amounts of free oil tend not to be effective, and actually are deleterious, at hot, process temperatures and in the presence of free oil.

The copolymers of the present invention are cationic emulsion copolymers of acryloxyethyltrimethylammonium chloride (AETAC) and acrylamide (AM). The mole ratio of AETAC to AM can range from about 21:79 to about 99:1. Preferably, the ratio is between about 40:60 and 80:20. The copolymers are of high molecular weight (MW) which can range from about 2 to about 20 million grams per mole. These copolymers are preferably of a molecular weight at the high end of this range. These copolymers are polymerized in the form of a water-in-oil or invert emulsions incorporating appropriate surfactants. The emulsified copolymer is then inverted and diluted in water to about 0.05 to about 0.5% actives prior to use.

The copolymers of the present invention are preferably prepared by a water-in-oil emulsion technique. Such processes are disclosed in U.S. Pat. Nos. 3,284,393; Re. 28,474 and Re. 28,576 incorporated herein by reference. In general, the technique comprises preparation of an aqueous phase, ranging from about 50% to about 90% by weight of the total emulsion. The aqueous phase comprises water, monomers described above, chelating agents and initiator(s) if the chosen initiator(s) are water-soluble. The total amount of monomers can range from about 30% to 80% by weight, based on the total weight of the aqueous phase.

The oil phase, ranging from about 10% to about 50% by weight of the total emulsion, comprises a liquid organic hydrocarbon and water-in-oil emulsifying agents. The oil phase may optionally contain the initiator(s), if the chosen initiator(s) are oil-soluble. The water-in-oil emulsifiers are usually low HLB surfactants. Typical emulsifiers are described in U.S. Pat. No. Re. 28,576.

After the aqueous phase and oil phase have been prepared separately, the aqueous phase is homogenized into the oil phase. The system is then sparged with nitrogen to remove oxygen from the system. Polymerization is initiated by adding a reducing agent to form a redox pair or by heat to induce decomposition of initiator(s) in the emulsion.

After polymerization is complete, high HLB inverting surfactants such as those described in U.S. Pat. No. Re. 28,474 are added to convert the resulting emulsion to a "self-inverting" emulsion. The resulting emulsion disperses and dissolves rapidly into an aqueous solution upon addition to water.

EXAMPLES

The following examples are intended to show the efficacy of the present invention as a breaker for reverse and obverse emulsions. They are not intended to limit the scope of the invention or manner in which it is practiced. Table I describes the treatments tested in the Examples. Table II summarizes the viscosity (related to molecular weight) of several of the treatments tested.

TABLE I

| Treatment | Description | | |
|---|---|---|---|
| A | AETAC:AM Copolymer (40:60 mole ratio) | $10^7$ MW | 42% Active |
| B | AETAC:AM Copolymer (52:48 mole ratio) | $10^7$ MW | 46% Active |
| C | MAPTAC:AM Copolymer (5:95 mole ratio) | $10^7$ MW | 41% Active |
| D | MAPTAC:AM Copolymer (42:58 mole ratio) | $10^7$ MW | 41% Active |
| E | AETAC:AM Copolymer (2:98 mole ratio) | $10^7$ MW | 31% Active |
| F | METAC:AM Copolymer (9:91 mole ratio) | $10^7$ (linear) | 38% Active |
| G | AETAC:AM Copolymer (10:90 mole ratio) | $10^7$ (graft) | 34% Active |
| H | METAC:AM Copolymer (10:90 mole ratio) | $10^7$ (graft) | 35% Active |
| I | DMA:EPI; DMAPA Terpolymer | $10^4$ MW | 31% Active |
| J | DADMAC Polymer | $10^5$ MW | 19% Active |
| K | AETAC:AM:AA Terpolymer | $10^5$ MW | 14% Active |
| L | ADA:DETA; EPI Terpolymer + J + K | $10^4$ MW | 15% Active |
| M | Polyalkanolamine | $10^4$ MW | 35% Active |
| N | Blend of M and O (1:1 by actives) | $10^4$ MW | 15% Active |
| O | Blend of quaternary amine EO adducts | $10^3$ MW | 15% Active |
| P | $Al_2Cl(OH)_5$ + Poly (DADMAC) (5:1 by actives) | $10^5$ MW | 15% Active |
| Q | AETAC:AM Copolymer (40:60) | $2 \times 10^7$ MW | 41% Active |
| R | METAC:AM Copolymer (40:60) | $10^7$ MW | 39% Active |
| S | MAPTAC:AM (40:60) | $10^7$ MW | 38% Active |
| T | AETAC:AM (80:20) | $2 \times 10^7$ MW | 41% Active |
| U | METAC:AM (80:20) | $10^7$ MW | 39% Active |
| V | MAPTAC:AM (80:20) | $10^6$ MW | 37% Active |
| X | METAC (100%) | $10^5$ MW | 20% Active |
| Y | Nonylphenol:EO | $10^3$ MW | 25% Active |
| Z | Alcohol:EO sulfate | $10^2$ MW | 40% Active |
| AA | PO:EO block copolymer | $10^3$ MW | 20% Active |
| BB | PO:EO block copolymer (20%) Quaternary Amine:EO (5%) Quaternary Amine:EO (5%) | $10^3$ MW | |
| CC | Quaternary Amine:EO (15%) Quaternary Amine:EO (15%) | $10^3$ MW | 23% Active |
| DD | Dialkylsulfosuccinate | $10^2$ MW | 30% Active |
| EE | Nonylphenol Resin:EO | $10^3$ MW | 30% Active |
| FF | Butylphenol Resin:EO | $10^3$ MW | 25% Active |
| GG | Nonyl + Butylphenol:EO (20/12) | $10^3$ MW | 25% Active |
| HH | Nonyl + Butylphenol:EO (14/16) | $10^3$ MW | 23% Active |
| II | Nonyl resin + poly PO:EO (25/10) | $10^3$ MW | 31% Active |
| JJ | Nonyl resin + poly PO:EO (17/15/3) | $10^3$ MW | 30% Active |
| KK | Nonyl + Amyl resin + poly PO:EO (11/13/6) | $10^3$ MW | 24% Active |
| LL | Nonyl Resin + Quat. Amine:EO (30/5) | $10^3$ MW | 31% Active |
| MM | Nonyl Resin/Poly PO:EO ester | $10^4$ MW | 27% Active |
| NN | Poly PO:EO ester | $10^4$ MW | 35% Active |
| OO | Poly PO:Epoxide:EO | $10^4$ MW | 35% Active |
| PP | AETAC:AM copolymer (2.5:97.5) | $10^7$ MW | 41% Active |
| QQ | AETAC:AM copolymer (5:95) | $10^7$ MW | 41% Active |
| RR | AETAC:AM copolymer (10:90) | $10^7$ MW | 41% Active |
| SS | AETAC:AM copolymer (20:80) | $10^7$ MW | 41% Active |
| TT | METAC:AM copolymer (2.5:97.5) | $10^7$ MW | 39% Active |

TABLE I-continued

| Treatment | Description | | |
|---|---|---|---|
| UU | METAC:AM copolymer (5:95) | $10^7$ MW | 39% Active |
| VV | METAC:AM copolymer (10:90) | $10^7$ MW | 39% Active |
| WW | METAC:AM copolymer (20:80) | $10^7$ MW | 39% Active |
| XX | MAPTAC:AM copolymer (3:97) | $10^7$ MW | 37% Active |
| YY | MAPTAC:AM copolymer (10:90) | $10^7$ MW | 37% Active |
| ZZ | MAPTAC:AM copolymer (20:80) | $10^7$ MW | 37% Active |

AA = Acrylic Acid
AM = Acrylamide
AETAC = Acryloxyethyltrimethyl-ammonium chloride
MAPTAC = Methacrylamidopropyltrimethylammonium chloride
METAC = Methacryloxyethyltrimethylammonium chloride
DMA = Dimethylamine
EPI = epichlorohydrin
DMAPA = Dimethylaminopropylamine
DADMAC = Diallyldimethylammonium chloride
ADA = Adipic Acid
DETA = Diethylenetriamine
EO = poly(ethylene oxide)
PO = poly(propylene oxide)

TABLE II

| Treatment | Composition | 0.5% Viscosity* | UL Viscosity** |
|---|---|---|---|
| A | 40% AETAC | 1460 cps | 20.5 cps |
| B | 52% AETAC |  | 18.9 |
| C | 5% MAPTAC | 860 | 11.8 |
| D | 30% MAPTAC | 1168 | 7.3 |
| Q | 40% AETAC | 2820 | 33.1 |
| R | 40% METAC | 1800 | 16.2 |
| S | 40% MAPTAC | 500 | 5.0 |
| T | 80% AETAC | 2360 | 32.2 |
| U | 80% METAC | 1255 | 7.8 |
| V | 80% MAPTAC | 45 | 2.6 |
| PP | 2.5% AETAC | 260 | 33.6 |
| QQ | 5% AETAC | 480 | 32.3 |
| RR | 10% AETAC | 1190 | 26.9 |
| SS | 20% AETAC | 2590 | 28.3 |
| TT | 2.5% METAC | 358 | 28.3 |
| UU | 5% METAC | 675 | 19.2 |
| VV | 10% METAC | 1010 | 18.0 |
| WW | 20% METAC | 1890 | 19.5 |
| XX | 3% MAPTAC | 235 | 15.6 |
| YY | 10% MAPTAC | 1505 | 12.6 |
| ZZ | 20% MAPTAC | 1310 | 11.6 |

*0.5% visc. → 0.5% active polymer in DI water.
**UL visc. → 0.3% active polymer in 4% NaCl solution.

Example 1

Materials to be tested were tested at 200° F. on a sample from the water leg of a desalter. The oily effluent brine was a light chocolate-brown oil-in-water (reverse) emulsion with about 4% free water-in-oil (obverse) emulsion (containing about 60% water) also present. Table I describes the treatments tested and Table III summarizes the results. As can be seen in Table III, only 3 of the 16 products tested resolved any significant amount of the reverse emulsion in the presence of the obverse emulsion at the high test condition temperature (two AETAC:AM copolymers (A and B) and treatment P). However, treatment P required four times the treatment dose of Treatments A or B to achieve comparable results.

TABLE III

| Treatment | Dose (ppm Product) | Rating | Water Clarity |
|---|---|---|---|
| A | 80 | 2 | Almost clear |
| B | 80 | 1 | Clear |
| C | 80 | 6 | Slight clearing |
| D | 80 | 4 | Mostly translucent |
| E | 80 | 8 | No effect |
| F | 80 | 4 | Mostly translucent |
| G | 80 | 7 | Slight effect |
| H | 80 | 6 | Slight clearing |
| I | 80 | 6 | Slight clearing |
| J | 160 | 6 | Slight clearing |
| K | 160 | 5 | Almost translucent |
| L | 160 | 5 | Almost translucent |
| M | 160 | 7 | Slight effect |
| N | 160 | 8 | No effect |
| O | 160 | 8 | No effect |
| P | 160 | 3 | Mostly clear |
| P | 240 | 2 | Almost clear |
| P | 320 | 1 | Clear |
| Blank | — | 8 | No effect |

*Light chocolate brown oil-in-water emulsion with 4% free water-in-oil emulsion (probably 60% water) floating.

Example 2

Select treatments described in Table I were tested in a desalter simulator test wherein the treatment was added to a 98% crude 2% wash water mixture. The crude oil was treated with a blend of nonylphenol formaldehyde resin ethoxylates and polypropyleneglycolethoxylates (designated X in Table IV). The test duplicated the temperature (250° F.), shear ($10^5$ s$^{-1}$) and duration (1 second) of a desalter mix value and the temperature (250° F.) residence time (60 minutes) and electric field strength (4 kV/in) and uniformity of the desalter coalescer. The wash water was treated (as indicated in Table IV) before it was mixed with the crude. Table IV summarizes the results. Although in this example Treatments A and B did slightly retard the water drop from the emulsion, the resolution of the reverse emulsion allowed more room, and thus time, for the obverse emulsion to resolve, so that in actual plant use, dehydration improved. This result is unexpected because high molecular weight emulsion polymers are generally expected to hinder dehydration.

TABLE IV

DESALTER SIMULATOR DEMULSIFICATION TESTS ON RAW CRUDE AND WASH WATER*

| EB Treatment to Oil | Dose (ppm EB Product) | RB Treatment to Water | Dose (ppm RB Product) | Mean Water Drop (%)** |
|---|---|---|---|---|
| X | 24 | none | 0 | 1.26 |
| X | 21 | A | 2 | 0.96 |
| X | 21 | B | 2 | 1.02 |
| X | 21 | L | 4 | 0.98 |
| X | 21 | P | 5 | 1.30 |
| X | 18 | A + P | 2 + 5 | 1.22 |

*98% Crude Mixed with 2% Water
**Amount of water resolved from the emulsion and dropped to the bottom of the test tube - average of 5 temporally sequential readings.
X = Emulsion Breaker (EB); is a blend of nonylphenolformaldehyde resin ethoxylates and polypropyleneglycol ethoxylates.
RB = Reverse Breaker

Example 3

Select treatments described in Table I were added to effluent brines comprising 5–10% oil and solids at 200° F. in a bottle test wherein the treated samples were shaken hard 20 times in a half filled bottle, observed while settling and compared after equilibration. Tables V, VI and VII summarize the results.

TABLE V

| Treatment | ppm Active | Clarity Rank | Description |
|---|---|---|---|
| A | 1.5 | 3 | some coagulation |
|   | 3.0 | 2 | translucent |
|   | 6.0 | 1 | fairly clear |
|   | 12.0 | 1 | fairly clear |
|   | 24.0 | 2 | translucent |
|   | 48.0 | 3 | some coagulation |

TABLE VI

| Treatment | ppm Active | Clarity and Speed Rank | Description | ppm Active | Clarity Rank | Speed Rank |
|---|---|---|---|---|---|---|
| Blank | 0 | 6 | tan opaque | — | — | — |
| A | 6.0 | 2 | fairly clear | — | — | — |
| B | 6.0 | 3 | pale translucent | — | — | — |
| C | 6.0 | 6 | tan opaque | — | — | — |
| D | 6.0 | 5 | amber translucent | — | — | — |
| E | 6.0 | 8 | dark brown opaque | — | — | — |
| F | 6.0 | 4 | yellow translucent | — | — | — |
| G | 6.0 | 7 | brown opaque | — | — | — |
| I | 6.0 | 7 | brown opaque | 12.0 | 3 | 7 |
| J | 6.0 | 4 | yellow translucent | 12.0 | 9 | 6 |
| K | 6.0 | 5 | amber translucent | 12.0 | 6 | 3 |
| L | 6.0 | 6 | tan opaque | 12.0 | 8 | 5 |
| M | 6.0 | 8 | dark brown opaque | 12.0 | 4 | 8 |
| N | 6.0 | 9 | black opaque | 12.0 | 5 | 9 |
| Q | 6.0 | 1 | very clear | — | — | — |
| R | 6.0 | 3 | pale translucent | — | — | — |
| S | 6.0 | 4 | yellow translucent | — | — | — |
| T | 6.0 | 1 | very clear | — | — | — |
| U | 6.0 | 3 | pale translucent | — | — | — |
| V | 6.0 | 4 | yellow translucent | — | — | — |
| P | 6.0 | 3 | pale translucent | 12.0 | 2 | 4 |
| X | 6.0 | 2 | fairly clear | 12.0 | 7 | 2 |
| Y | 6.0 | 7 | brown opaque | 12.0 | 7 | 8 |
| Z | 6.0 | 6 | tan opaque | 12.0 | 7 | 8 |
| AA | 6.0 | 6 | tan opaque | 12.0 | 7 | 8 |
| BB | 6.0 | 7 | brown opaque | 12.0 | 8 | 9 |
| CC | 6.0 | 7 | brown opaque | 12.0 | 8 | 9 |
| DD | 6.0 | 6 | tan opaque | 12.0 | 6 | 6 |
| EE | 24 | 9 | black opaque | 48.0 | 10 | 10 |
| FF | 16 | 8 | dark brown opaque | — | — | — |
| GG | 20 | 9 | black opaque | — | — | — |
| HH | 12 | 8 | dark brown opaque | 24 | 9 | 9 |
| II | 24 | 9 | black opaque | — | — | — |
| JJ | 12 | 8 | dark brown opaque | 24 | 9 | 9 |
| KK | 24 | 9 | black opaque | — | — | — |
| LL | 22 | 9 | black opaque | — | — | — |
| MM | 22 | 8 | dark brown opaque | — | — | — |
| NN | 28 | 8 | dark brown opaque | — | — | — |
| OO | 28 | 8 | dark brown opaque | — | — | — |

TABLE VII

| Treatment | ppm Active | Clarity and Speed Rank | Description |
|---|---|---|---|
| Q | 1.5 | 3 | pale translucent |
|   | 3.0 | 2 | fairly clear |
|   | 6.0 | 1 | very clear |
|   | 12.0 | 2 | fairly clear |

Example 4

Select treatments described in Table I were added to effluent brines comprising 5–10% oil and solids at 200° F. and subjected to a benchtop hydrocyclone. The benchtop hydrocyclone spins 40 mm by 150 mm flat bottomed cyclone tubes longitudinally at 7000 rpm (1000 G's and $10^5$ $s^{-1}$ shear at the wall) for 20 seconds. The treated samples were observed while spinning and after coming to rest. Tables VIII and IX summarize the result.

TABLE VIII

| Treatment | ppm Active | Clarity and Speed Rank | Description |
|---|---|---|---|
| Blank | 0 | 4 | yellow translucent, slow break |
| KK | 12 | 5 | amber translucent, slow break |
| Q | 6 | 1 | crystal clear, instant break |
| KK + Q | 12 + 6 | 1 | crystal clear, instant break |
| Sample 2 (~10% oil and solids in water) | | | |

TABLE IX

| Treatment | ppm Active | Clarity and Speed Rank | Description |
|---|---|---|---|
| Blank | 0 | 4 | yellow translucent, slow break |
| KK | 6 | 5 | amber translucent, slow break |
| Q | 6 | 1 | crystal clear, instant break |
| KK + Q | 6 + 6 | 1 | crystal clear, instant break |

Example 5

Three homologous series of cationic emulsion polymers comprising acrylamide copolymers of MAPTAC, METAC and AETAC at 2.5 to 80 mole percent were screened as reverse and obverse breakers. See Table I for a description of the treatments. The screenings were performed on a 210° F. produced fluid from a steam flooded California oilfield. Each of five group lines from different portions of the field and a production proportional composite were tested. The fluids were sampled after treatment upstream with an oil-based obverse emulsion breaker but untreated with any reverse breaker. Each group line had a somewhat different composition, but were roughly similar to the composite, which was composed of 67% reverse emulsion containing about 1% emulsified oil and 33% obverse emulsion containing about 50% emulsified water (for about 17% net oil). Each fluid was tested whole, by bottling from a well stirred carbon (rather than reconstituting from separated reverse and obverse emulsions). With this method all inter-phasal components are accounted for. The test mirrored the temperature (210° F.), shear (turbulent flow mixing by shaking hard 20 times in a half full bottle followed by quiescent coalescence in a hot water bath), and coalescer residence time (40 minutes for the water leg, 4 hours for the oil leg) of the production unit. Dose response and chemical preference was determined by visual inspection of the resultant quality of water (clarity) and oil and interface (shrinkage in emulsion volume). Table IX summarizes the results which show that: (a) the highest cationicity gave the best water clarity, (b) AETAC was the preferred monomer type, both for water clarity and oil dehydration.

having a mole percent of acryloxyethyltrimethylammonium chloride above about 20% and having a molecular weight above about 2 million.

2. The method of claim 1 wherein the ratio of acryloxyethyl-trimethylammonium chloride to acrylamide ranges from about 40:60 to about 80:20.

3. The method of claim 1 wherein the molecular weight of the acryloxyethyltrimethylammonium chloride/acrylamide copolymer is from about 10 million to about 40 million.

4. The method of claim 1 wherein from about 2 to about 200 parts per million of said copolymer based on the amount of water present is added to said system.

5. The method of claim 1 wherein said crude oil production and processing system comprises a hydrocyclone.

6. The method of claim 1 wherein said crude oil production and processing system comprises a hydrocarbon dehydration process.

TABLE IX

| | | Composite | | | | | | Individual Sections | | | | | | | | | |
|---|---|---|---|---|---|---|---|---|---|---|---|---|---|---|---|---|---|
| | | | | | | | | #1 | | #2 | | #3 | | #4 | | Marina | |
| | ppm* | 2 min WQ | 1 hr EV | 2 hr EV | ppm* | 2 min WQ | 1 hr EV | ppm* | 2 min WQ | ppm* | 2 min WQ | ppm* | 2 min WQ | ppm* | 2 min WQ | ppm* | 2 min WQ |
| Treatment | | | | | | | | | | | | | | | | | |
| S | 3 | 6 | 28 | | | | | | | | | | | | | | |
| | 6 | 6 | 28 | | | | | | | | | | | | | | |
| | 12 | 4 | 26 | | | | | | | | | | | | | | |
| | 24 | 5 | 27 | | | | | | | | | | | | | | |
| Q | 3 | 4 | 25 | | 3 | 4 | 24 | 3 | 7 | 3 | 9 | 3 | 5 | 3 | 10 | 3 | 8 |
| | 6 | 3 | 24 | | 6 | 3 | 23 | 6 | 5 | 6 | 7 | 6 | 5 | 6 | 10 | 6 | 6 |
| | 12 | 2 | 23 | | 12 | 2 | 22 | 12 | 1 | 12 | 3 | 12 | 2 | 12 | 10 | 12 | 4 |
| | 24 | 1 | 22 | | 24 | 1 | 21 | 24 | 0 | 24 | 1 | 24 | 0 | 24 | 2 | 24 | 1 |
| PP | 3 | 8 | 30 | 28 | 24 | 9 | 22 | 12 | 8 | 12 | 10 | 12 | 8 | 24 | 10 | 24 | 10 |
| QQ | 3 | 7 | 29 | 27 | 24 | 7 | 22 | 12 | 8 | 12 | 9 | 12 | 8 | 24 | 10 | 24 | 10 |
| RR | 3 | 6 | 28 | 26 | 24 | 5 | 22 | 12 | 5 | 12 | 8 | 12 | 5 | 24 | 10 | 24 | 10 |
| SS | 3 | 5 | 27 | 25 | 24 | 3 | 20 | 12 | 3 | 12 | 6 | 12 | 5 | 24 | 10 | 24 | 8 |
| Q | 3 | 4 | 25 | 24 | 24 | 1 | 21 | 12 | 1 | 12 | 3 | 12 | 2 | 24 | 2 | 24 | 2 |
| T | 3 | 3 | 26 | 25 | 24 | 0 | 20 | 12 | 1 | 12 | 1 | 12 | 1 | 24 | 1 | 24 | 1 |
| TT | 3 | 10 | 30 | 30 | 24 | 10 | 25 | 12 | 8 | 12 | 10 | 12 | 10 | 24 | 10 | 24 | 10 |
| UU | 3 | 10 | 30 | 28 | 24 | 10 | 25 | 12 | 8 | 12 | 8 | 12 | 8 | 24 | 10 | 24 | 10 |
| VV | 3 | 9 | 30 | 27 | 24 | 10 | 25 | 12 | 8 | 12 | 7 | 12 | 8 | 24 | 10 | 24 | 10 |
| WW | 3 | 8 | 30 | 28 | 24 | 9 | 22 | 12 | 5 | 12 | 6 | 12 | 8 | 24 | 10 | 24 | 10 |
| R | 3 | 7 | 30 | 27 | 24 | 8 | 22 | 12 | 3 | 12 | 5 | 12 | 5 | 24 | 8 | 24 | 6 |
| U | 3 | 6 | 30 | 28 | 24 | 6 | 24 | 12 | 3 | 12 | 4 | 12 | 2 | 24 | 2 | 24 | 4 |
| XX | 3 | 10 | 28 | 27 | 24 | 10 | 25 | 12 | 10 | 12 | 8 | 12 | 10 | 24 | 10 | 24 | 10 |
| C | 3 | 9 | 28 | 28 | 24 | 10 | 25 | 12 | 10 | 12 | 6 | 12 | 10 | 24 | 10 | 24 | 10 |
| YY | 3 | 8 | 28 | 29 | 24 | 9 | 25 | 12 | 8 | 12 | 4 | 12 | 8 | 24 | 10 | 24 | 8 |
| ZZ | 3 | 7 | 28 | 28 | 24 | 8 | 26 | 12 | 8 | 12 | 4 | 12 | 8 | 24 | 10 | 24 | 8 |
| S | 3 | 6 | 28 | 28 | 24 | 6 | 27 | 12 | 8 | 12 | 6 | 12 | 5 | 24 | 6 | 24 | 6 |
| V | 3 | 5 | 27 | 28 | 24 | 4 | 25 | 12 | 5 | 12 | 6 | 12 | 3 | 24 | 2 | 24 | 6 |
| C | 3 | 9 | 28 | 28 | 24 | 10 | 25 | 12 | 10 | 12 | 6 | 12 | 10 | 24 | 10 | 24 | 10 |
| Blank | 3 | 10 | 28 | 28 | 24 | 10 | 25 | 12 | 10 | 12 | 10 | 12 | 10 | 24 | 10 | 24 | 10 |

*ppm adjusted to standard 30% active basis
WQ = Water Quality (relative to clarity). 0 = crystal clear, 10 = blank (dark brown, opaque)
EV = Emulsion Volume (volume % of oil and intrface emulsion)

While the present invention has been described with respect to particular embodiments thereof, it is apparent that other forms and modifications of the invention will be obvious to those skilled in the art. The appended claims and this invention generally should be construed to cover all such obvious forms and modifications which are within the true spirit and scope of the present invention.

We claim:

1. A method of resolving oil-in-water and water-in-oil emulsions in crude oil production and processing systems comprising adding to the water of said systems a treatment solution consisting essentially of a copolymer of acryloxyethyltrimethyl-ammonium chloride and acrylamide 7. The method of claim 6 wherein said hydrocarbon dehydration process system comprises a coalescer treating a matrix which is 51–99% oil at a temperature of about 120°–300° F.

8. The method of claim 1 wherein said crude oil production and processing system comprises a coalescer treating an oil and water matrix comprising about 1–50% oil, not all of which is emulsified in the water, at a temperature of about 120°–300° F.

9. The method of claim 1 wherein said copolymer is an invert emulsion polymer inverted and diluted to about 0.05 to 0.5% actives in water.

* * * * *